United States Patent
Bohacek et al.

(10) Patent No.: US 6,411,687 B1
(45) Date of Patent: Jun. 25, 2002

(54) CALL ROUTING BASED ON THE CALLER'S MOOD

(75) Inventors: Peter Bohacek, Dallas, TX (US); Dieter Schulz, Kanata (CA)

(73) Assignee: Mitel Knowledge Corporation, Kanata (CA)

( * ) Notice: Subject to any disclaimer, the term of this patent is extended or adjusted under 35 U.S.C. 154(b) by 0 days.

(21) Appl. No.: 09/188,312

(22) Filed: Nov. 10, 1998

(30) Foreign Application Priority Data

Nov. 11, 1997 (GB) .............................. 9723813

(51) Int. Cl.[7] .................. H04M 1/64; H04M 11/00; H04M 3/42; H04M 3/00
(52) U.S. Cl. ................ 379/88.21; 379/88.07; 379/93.12; 379/201.11; 379/265.07; 379/265.12
(58) Field of Search .................... 379/88.01, 88.02, 379/88.07, 88.08, 88.13, 88.14, 88.16, 93.12, 102.03, 219, 220, 258, 265, 900, 902, 88.19, 88.2, 88.21, 93.18, 201.01, 201.11, 223, 265.01, 265.07, 265.12, 265.13, 266.01; 704/258, 260, 270, 275, 205, 206, 257; 700/11, 17, 56, 83

(56) References Cited

U.S. PATENT DOCUMENTS

| | | | | |
|---|---|---|---|---|
| 4,093,821 A | * | 6/1978 | Williamson | ............... 704/207 |
| 5,493,608 A | | 2/1996 | Osullivan | ................. 379/88 |
| 5,499,285 A | | 3/1996 | Morduch | .................... 379/52 |
| 5,553,119 A | * | 9/1996 | McAllister et al. | ........ 379/67.1 |
| 5,559,927 A | * | 9/1996 | Clynes | ...................... 395/267 |
| 5,832,435 A | * | 11/1998 | Silverman | .................. 704/260 |
| 5,943,648 A | * | 8/1999 | Tel | .............................. 704/260 |
| 5,987,415 A | * | 11/1999 | Breese et al. | ............... 704/270 |
| 6,081,750 A | * | 6/2000 | Hoffberg et al. | ............... 700/17 |
| 6,112,177 A | * | 8/2000 | Cosatto et al. | ............. 704/260 |
| 6,134,315 A | * | 10/2000 | Galvin | ........................ 379/219 |
| 6,185,292 B1 | * | 2/2001 | Miloslavsky | ................ 379/265 |

FOREIGN PATENT DOCUMENTS

| | | |
|---|---|---|
| EP | 0570082 A2 | 11/1993 |
| GB | 2265066 A | 9/1953 |

* cited by examiner

Primary Examiner—Allan Hoosain
(74) Attorney, Agent, or Firm—Marks & Clerk

(57) ABSTRACT

A call processing apparatus comprises a device for answering an incoming call, an interactive voice unit for eliciting information about the call from the customer, a device for analyzing the caller's response according to predetermined criteria to identify callers having certain behavioral characteristics, and a device for routing callers identified as having these characteristics to predetermined attendant stations. The apparatus therefore permits caller's having special needs to be automatically routed to suitably trained attendants.

11 Claims, 3 Drawing Sheets

CALL ROUTING BASED ON THE CALLER'S MOOD

FIELD OF THE INVENTION

This invention relates to the field of telephony, and in particular to intelligent call processing apparatus.

BACKGROUND OF THE INVENTION

It is becoming increasingly common for businesses to establish call centers for dealing with customers, for example, to take orders and deal with customer queries. Often these will employ automated PBXs (Private Branch Exchange) that present the customer with a menu of choices and route the call to an appropriate attendant according to the customer responses.

The problem with existing systems is that while many calls are mundane, such as simple technical queries, and can be handled by semi-skilled operators, some calls, for example from irate customers with complaints, require handling by specially trained operators. It is important that such calls are effectively handled to prevent loss business. Under the present system, an attendant can manually pass the caller to the specially trained operator. Not only is this inefficient, the delay resulting from being handed to another attendant can often aggravate a sensitive customer who may already not be in the best of moods. It is not generally desirable for the caller to know that he or she is receiving special treatment.

An object of the invention is to alleviate this problem.

SUMMARY OF THE INVENTION

According to the present invention there is provided a call routing processing comprising a call answering device for answering an incoming call, an interactive voice unit for eliciting information about the call from the customer, a behavioral response device for analyzing the caller's response according to predetermined criteria to identify callers having certain behavioral characteristics, and a routing device for routing callers identified as having said characteristics to predetermined attendant stations.

The behavioral characteristics can be the caller's mood. For example, angry callers can be directed to specially trained operators.

The analyzing means can, for example, be a speech recognition device that detects high stress or annoyance, a Touch-tone timing device that detects caller impatience or annoyance as they enter touch-tone digits, a speech recognition device that detects the sex and approximate age of the caller (male, female, child), a speech recognition device that detects language characteristics, such as accents or stuttering.

With the apparatus in accordance with the invention, call centers can be much more effective. By automatically detecting the mood and switching the call to agents who are good at handling these types of calls, the transaction will be handled more smoothly, more quickly and with more customer satisfaction. The call can be handled by the attendant that is best for handling that kind of calls or the attendant could adapt his/her style to match the needs of the caller.

The invention also provides a method a method of routing calls in a call center, comprising the steps of receiving an incoming call in an interactive voice unit, analyzing the caller's response according to predetermined criteria to identify behavioral characteristics, and routing the call to an agent selected in accordance with the identified characteristics.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1:
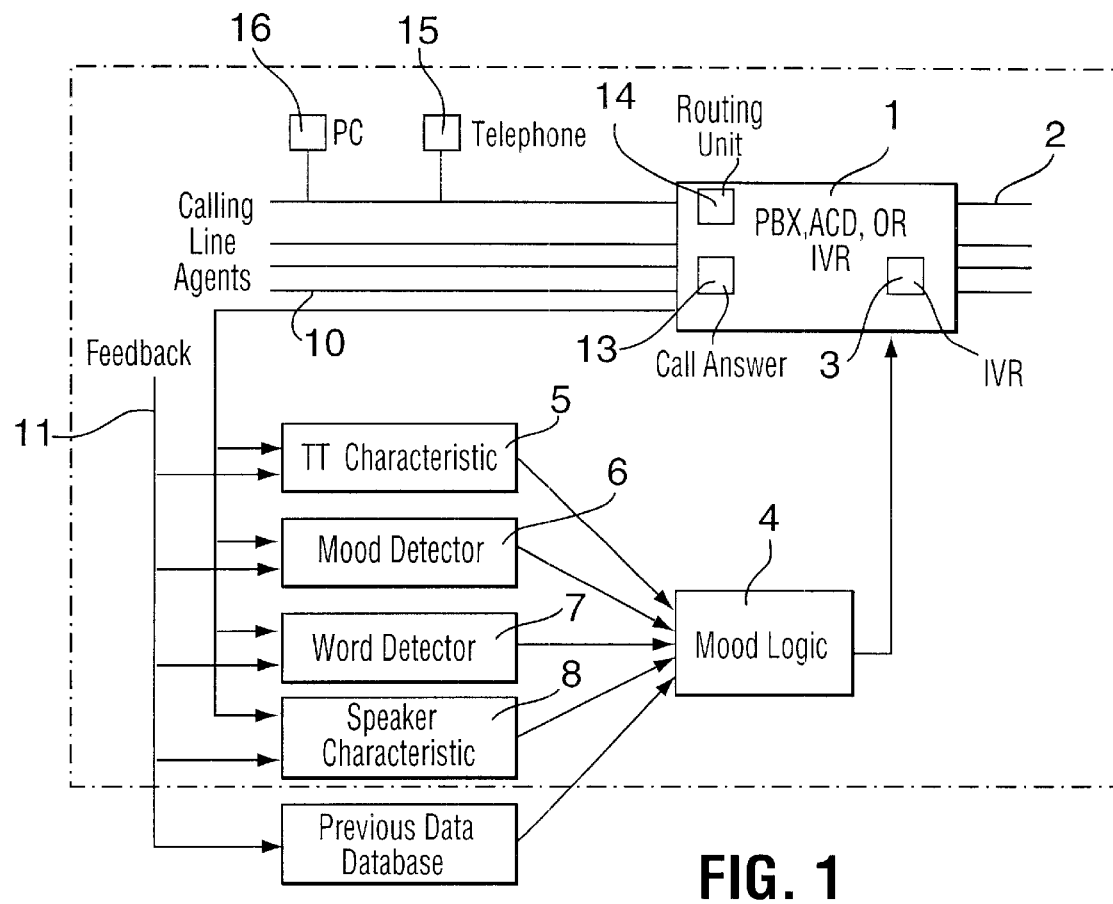
FIG. 1 is a block diagram of a system in accordance with the invention.

Switch 1, for example, a Mitel Corporation automated private branch exchange is connected to incoming trunks 2. The PBX includes a call answer unit 13 and an interactive voice response unit (IVR) 3. The IVR 3 permits a caller to elect options in response to prompts using a touch tone keypad on a standard telephone.

The switch 1, including routing unit 14, routes calls to calling agents over lines 10. Each calling agent station is provided with a computer 16 and telephone 15.

The switch 1 is connected to mood analyzer, via an output line 9. The mood analyzer consists of a Touch-tone (TT) characteristic unit 5, mood detector 6, word detector 7 and speaker characteristic unit 8.

The "TT Characteristic" logic unit 5 examines the duration of Touch Tone tones, the rapidity of the response and the frequency with which the selection is made. For example, very rapid selection may be an indication of a customer who is angry or in a hurry. Repeated pushing of the same button is also an indication of anger or impatience. A prolonged pushing of a Touch Tone button may be an indication of an annoyed customer. The TT Characteristic unit 5 analyzes the Touch Tone signals with a neural net device and produces an output that indicates the degree of the caller's potential impatience or annoyance of the caller, based on the above measurements. This output is sent to the mood logic unit 4. Suitable neural nets are described, for example, in "An Introduction to Computing with Neural Nets", IEEE ASSP Magazine, pp 4–22, April 1987. Neural nets have the ability to "learn" on the basis of past experience.

The mood detector unit 6 monitors the caller's voice and by analyzing the phonemes or other voice characteristics, such as rapidity of speech, loudness or quickness of response with a neural net device. Based on these features the mood detector unit determines the degree of the caller's potential annoyance or the impatience of the caller. This parameter is also sent to the mood logic unit 4.

The word detector unit 7 listens to the caller's voice and carries out key word recognition of specific words that would indicate annoyance or impatience. These are, for example, swear words, curse words or extra phrases indicating impatience (e.g. "come on already."). A speaker independent voice recognition device extracts these features and feeds them to a neural net device which computes the caller's potential annoyance or impatience. A suitable such device is described, for example, by B. I. Pawate and P. D. Robinsons, in "Implementation of an HMM-Based Speaker-Independent Speech Recognition System on the TMS320C2x and TMS320C5x", Texas Instruments Incorporated, 1996. This parameter is sent to the mood logic unit 4.

The speaker characteristic unit 8 monitors the caller's voice and analyzes the speech phonemes and other characteristics, such as frequency spectrum, to determine of approximate age and sex of the caller. The pitch is extracted with a pitch detector. The logic in the box determines if the speaker is a male adult, female adult or a child. It also examines phonemes to determine if the caller has a strong accent, indicating potential language preference. This information is sent to the mood logic unit 4.

The mood logic unit contains logic, such as a neural net device, that combines all the available information to determine the potential degree of the caller's annoyance, the degree of impatience, if the caller is male or female or a child and potential language preference. This information is sent to the PBX or ACD before the call is switched to an agent by routing unit 14 in the switch 1.

The information is used in two ways: When the annoyance level exceeds a preset threshold determined by the mood logic unit 4, it is used by the switch to route the call to a set of agents that are good at dealing with annoyed customers. The sex of the caller can be used to route the call to agents of the appropriate sex to improve the handling of the caller. The degree of potential annoyance of impatience, as determined by the mood logic unit 4, is then displayed on the screen of the agent's PC 16 to indicate the potential degree of that caller's mood. The agent can then use this for the opening greeting and listen for confirmation of that mood from interaction with the caller. If the mood indicator was inaccurate, the agent can quickly revert to normal handling of the call.

The degree of accuracy can be fed back into the system by the agent along line 11, updating the weights in the neural net devices, increasing the accuracy for future calls.

Figure 2:
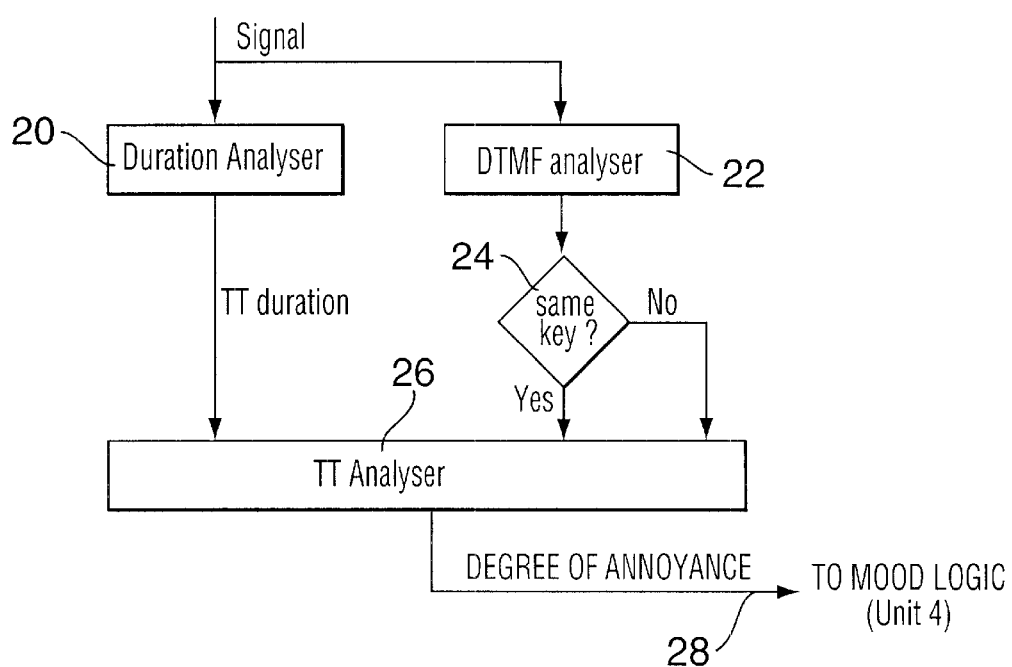
FIG. 2 is a block diagram of a touch tone analyser.

The touch tone characteristic analyzer is shown in more detail in FIG. 2. Signal from line 9 is applied to duration analyzer 20, which determines the touch tone duration, and DTMF analyzer 22, which identifies the key depressed. Decision unit 24 determines whether it is the same key as the previous key. The outputs of decision unit 24 and duration analyzer 20 are applied to touch tone analyzer 26, which can determine the degree of annoyance from these parameters based on previous experience.

Figure 3:
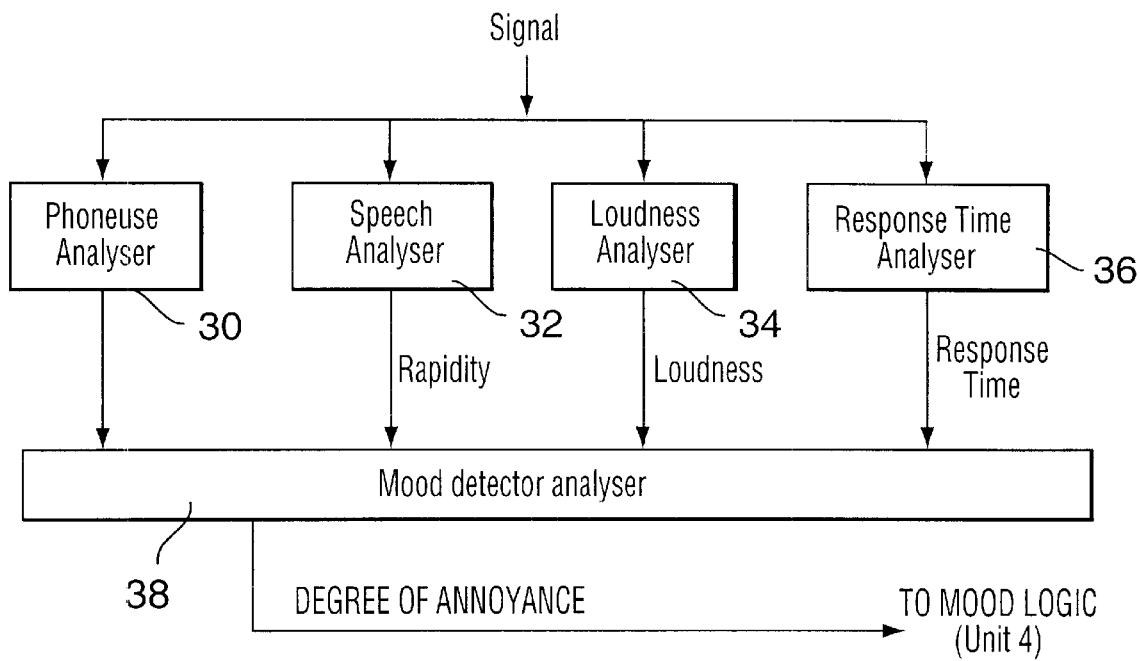
FIG. 3 is a block diagram of a mood detector.

Mood detector 6, shown in more detail in FIG. 3, applies the signal from line 9 to phoneme analyzer 30, speech analyzer 32, which determines rapidity of the caller's speech, loudness analyzer 34 and response time analyzer 36.

Figure 4:
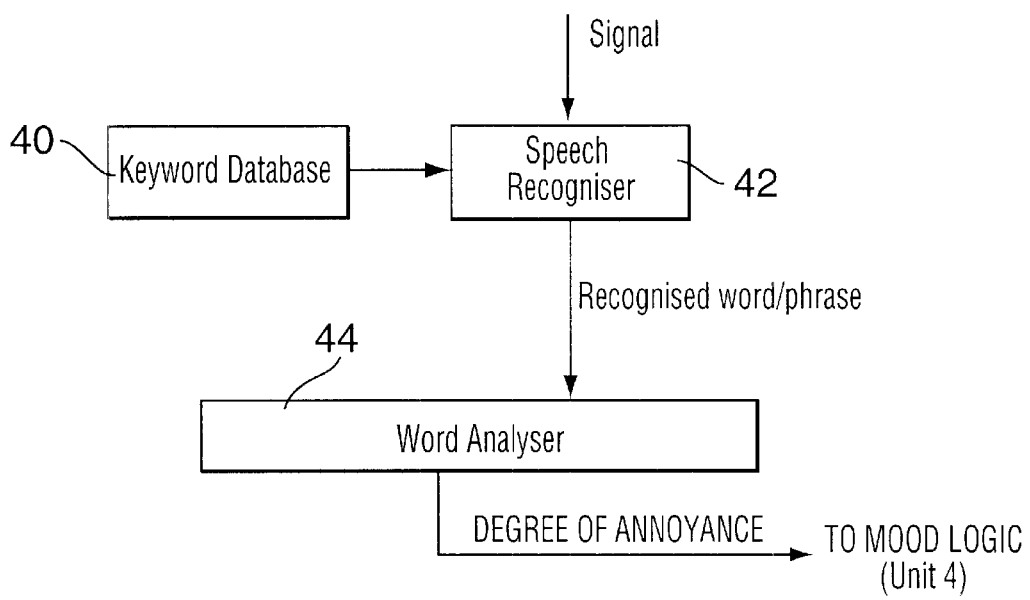
FIG. 4 is a block diagram of a word detector.

Word detector 7, shown in more detail in FIG. 4, includes a keyword database 40, a speech recognizer 42, and word analyzer 44. If a word detected by speech recognizer 42 is found in database 40, word analyzer 44 outputs a signal to mood logic 4 dependent on the nature of the word. Some words clearly indicate a greater degree of annoyance than others.

Figure 5:
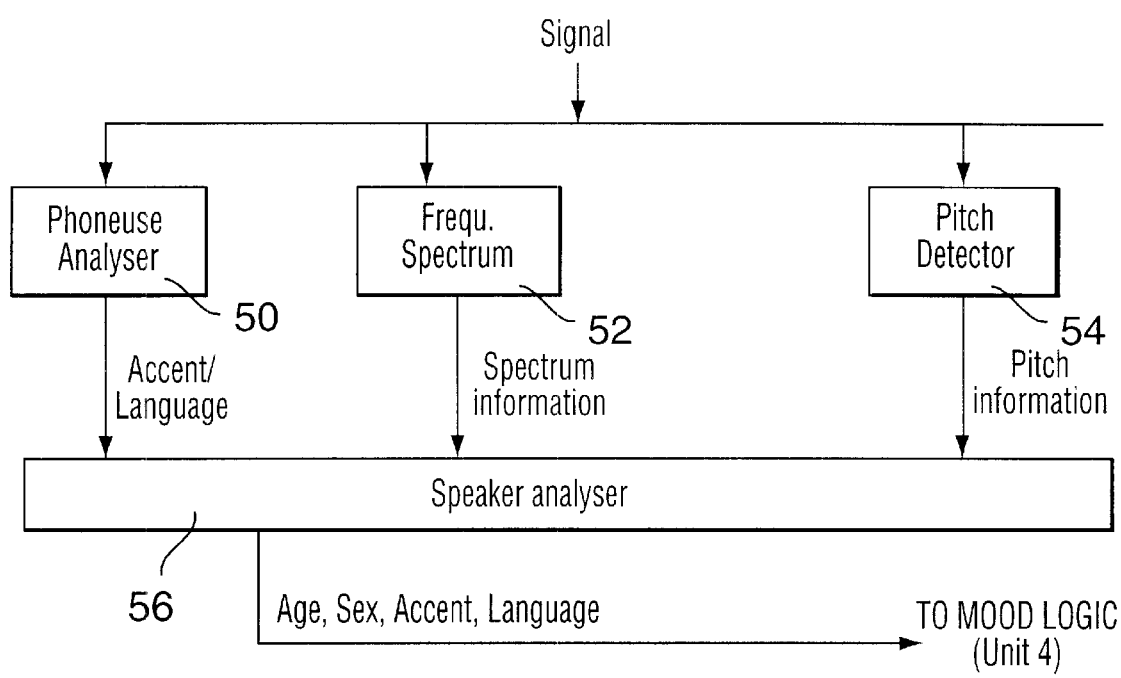
FIG. 5 is a block diagram of a speaker characteristics detector.

Speaker characteristics unit 8, shown in more detail in FIG. 5, comprises a phoneme analyzer 50, a frequency spectrum analyzer 52, a pitch analyzer 54, and a speaker analyzer 56. Speaker analyzer 56 provides an output signal indicative of the speaker's age, sex, accent, language etc.

When a call is received by the call center switch 1, it is first connected to the interactive voice response unit (IVR) 3 and the mood analyzer. The IVR asks the caller for information, such as the caller's account number or the nature of the call (e.g. reservation, flight arrival, billing problem) etc. While this information is being collected and processed in a conventional manner, the same speech samples and touch-tone inputs are analyzed for the mood of the caller by units 5 to 8. The call is then routed to the next available agent that is good at handling this kind of call. For example an angry male/female could be routed to a patient female/male agent who has been trained in dealing with annoyed customers. A caller who is in a hurry will be routed to a trained agent and a message indicating this is flashed on the agent's screen. The call is then handled in the normal way.

Errors in mood detection are quickly corrected when the agent realizes that the automated indication is incorrect and reverts to normal interaction. The agent can feed back the degree of accuracy into the system over line 11, increasing the accuracy for future calls. Database 12 stores previously collected data, which can be used to enhance the accuracy of the system. The mood detection devices can measure many parameters, such as: indication of stress in the speech, very rapid response to questions, added words in the speech that indicate moods (e.g. swearwords), phonemes that only occur in other languages, indicating an accent, poor automatic speech recognition, indicating either an accent or speech impediment, rapid pushing of touch-tone buttons, or very long pushing of touch-tone buttons, indicating annoyance, multiple pushing of touch-tone button, when only one is required.

The results of all these measurements are combined to compute the most likely customer mood parameter. This parameter is then used by the switch to route the call to the most appropriate agent available and the parameter is also flashed on the agent's screen to provide an indication of the likely state of the caller.

Previous customer data can be added to the mood/language parameter. For example, after a customer inputs his/her account number, the database 12 might contain information that this customer is often in a particular mood, or has recently had a problem, or has a particular speech characteristic. If the mood indication was correct, this data could be added to the customer data, indicating that the mood indicator properly measured the customers mood and to keep a track record of the customer interactions to help in the prediction on subsequent calls.

Mood indicators can be used in many applications, including operators of machinery, to detect the error proneness of the operator.

Mood indicators can be used to bail out a frustrated caller who is unable to select the right choice in a voice mail system or IVR system. This user might, for instance, repeatedly push "0", hoping to get to a human being. This could be detected and override the normal routing to switch the caller to an operator.

The invention thus provides a significant improvement over prior art systems in that it allows calls to be routed efficiently to personnel most suitably qualified to handle an incoming call.

We claim:

1. A call processing apparatus comprising;
   a call answering device for answering an incoming call from a caller;
   an interactive voice unit for eliciting information about the call from the caller by requiring the caller to provide input in response to prompts from said interactive voice unit;
   a behavioral response analyzer for dynamically analyzing predetermined characteristics of the caller's touch-tone responses to requests from said interactive voice unit during said incoming call based on predetermined criteria associated with input characteristics identified with different moods to identify callers having specific moods; and a routing device for routing callers identified as having said specific moods to attendant stations specialized in dealing with callers in such moods.

2. A call processing apparatus as claimed in claim 1, further comprising a speech extractor for extracting speech samples from the callers responses, and a speech analyzer for identifying predetermined characteristics in said speech samples.

3. A call processing apparatus as claimed in claim 2, wherein said speech analyzer comprises a word detector for identifying predetermined words in said speech samples characteristic of certain moods.

4. A call processing apparatus as claimed in claim 3, wherein said speech analyzer comprises a speaker characteristic detector for determining the approximate age and sex of the caller by analyzing voice input from the caller.

5. A call processing apparatus as claimed in claim 4, wherein said speaker characteristic detector is responsive to speech phonemes.

6. A call processing apparatus as claimed in claim 4, wherein said speaker characteristic detector is responsive to the frequency spectrum of the speech samples.

7. A call processing apparatus as claimed in claim 1, further comprising a neural net for determining the caller's mood.

8. A call processing apparatus as claimed in claim 1, further comprising a display device responsive to the output of said behavioral response analyzer to display an indication of the mood of the caller.

9. A method of routing calls in a call center, comprising the steps of:
   receiving incoming calls from callers in an interactive voice unit;
   prompting the callers for input to elicit information from the callers;
   analyzing predetermined characteristics of the callers' activation of a touch tone keypad to identify certain characteristics of said activation indicative of the caller's mood during said incoming calls according to predetermined criteria associated with different input characteristics identified with different moods; and
   routing the incoming calls to a specialized agent selected for handling callers having the identified specified moods.

10. A method as claimed in claim 9, wherein the identified characteristics are displayed on a screen for viewing by the selected agent receiving the call.

11. A method as claimed in claim 9, wherein the caller's voice is analyzed to identify certain characteristics indicative of the caller's moods.

* * * * *